Figure 1:
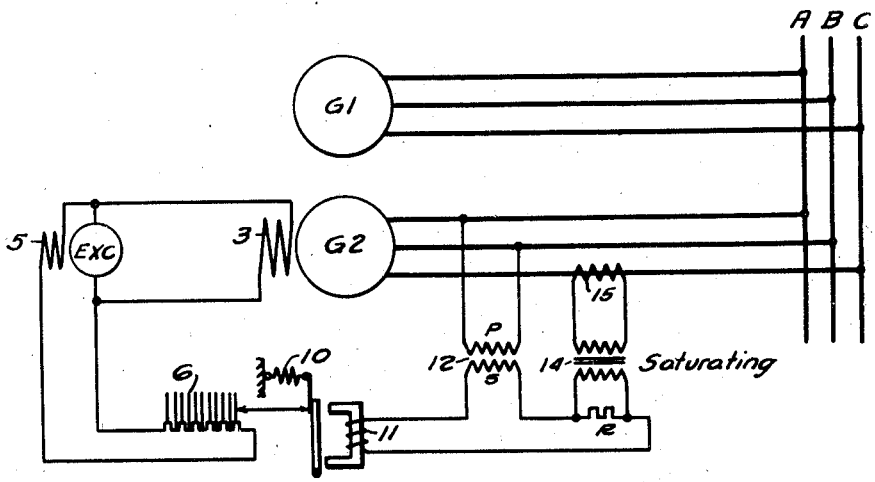

Sept. 20, 1949.  E. L. HARDER  2,482,481
REGULATOR SYSTEM
Filed Jan. 18, 1946

WITNESSES:

INVENTOR
Edwin L. Harder.
BY
ATTORNEY

Patented Sept. 20, 1949

2,482,481

UNITED STATES PATENT OFFICE 2,482,481

REGULATOR SYSTEM

Edwin L. Harder, Pittsburgh, Pa., assignor to Westinghouse Electric Corporation, East Pittsburgh, Pa., a corporation of Pennsylvania Application January 18, 1946, Serial No. 642,039

10 Claims. (Cl. 322—25)

My invention relates to voltage-regulator systems, and particularly to voltage-regulator systems such as are utilized for controlling the excitation of parallel-connected polyphase generators, or, in general, for the voltage-regulation of any polyphase power-system.

One of the difficulties in connection with the operation of voltage-regulators for polyphase generators, whether the generators are parallel-connected or not, has been the necessity, in general, for utilizing either the average 3-phase voltage, or the positive-sequence voltage-component, for energizing the voltage-regulator. The reason for this, in many cases, has been that the initial values of the several phase-voltages of the generator, during transient conditions, such as conditions immediately following a single-phase fault, are determined by the relative values of the subtransient positive-sequence generator-reactance and the negative-sequence generator-reactance, and in generators in which the negative-sequence reactance is materially greater than the subtransient reactance, the initial voltage-change, on one or both of the unfaulted phases, in the event of a single-phase fault, is likely to be a rise in voltage, which takes place before the positive-sequence reactance changes from its subtransient value to its transient value, and finally to its synchronous value, which is very much larger, and which becomes effective at a later period, depending upon the time-constants of the generator.

Besides the possibility of an instantaneous voltage-rise in an unfaulted phase of a polyphase generator or system, in response to a single-phase fault, almost all, or many, voltage-regulators are provided with current-compensation, of one form or another, which may have the effect of adding a current-traversed impedance-drop to the line-derived voltage which is applied to the voltage-regulator, so as to regulate the generator or system for the voltage which appears at some point other than the point at which the voltage-regulator is connected. For example, in the case of parallel-operated polyphase generators, operating on a common polyphase bus at the generator-terminals, it is common to utilize a 5% reactive droop compensator, which produces the effect of a 5% inductive reactance, connected between each generator and the bus, for giving sufficient droop to enable the parallel-connected generators to properly divide the wattless load between themselves. The effect of the compensator-voltage is to cause the voltage on the regulator to increase, at the time of fault, unless the decrease in voltage, due to the fault, is larger than the compensator voltage; and if the fault draws a line-current which is several times larger than the full-load current, the compensator-voltage may be quite large.

The vast majority of synchronous polyphase machines will fall in the category of machines having a negative-sequence reactance which is approximately equal to, or less than, or at least not materially greater than, the subtransient positive-sequence reactance, so that a single phase-to-phase fault will produce an immediate voltage-drop in both of the unfaulted phases, this voltage-drop being materially more than the 5% compensator-voltage at zero-power-factor full-load current, as produced by the reactive droop compensator. Under fault-conditions, however, the line-current may be several times the full-load value, so that the compensator-voltage, if still approximately linearly responsive to the current at these high current-magnitudes, as has heretofore been the case, becomes considerably larger than the drop in line-voltage on the unfaulted phases, thus resulting in an initial increase, rather than a decrease, in the regulating voltage which is actually applied to the voltage-regulator.

The practical effect of these considerations is that if the controlling voltage which is applied to a regulator is derived from a single phase of the line-voltage, and if a fault should occur on some other phase of the line-voltage, the controlling voltage which is applied to the voltage-regulator may initially increase, in response to the fault-condition, thus causing the voltage-regulator to decrease the line-voltage, in order to bring the impressed regulating-voltage down to the desired predetermined norm.

However, in the event of a fault, it is desirable to increase the generator-excitation, so as to increase the line-voltage. In systems in which transient stability is a problem, and in systems in which voltage-flicker is to be minimized, it is very desirable to have an immediate, large, and rapid increase in the excitation of the synchronous machine, in response to a fault on any phase of the line. In certain other systems, where there is no stability problem, and where voltage-flicker could be easily tolerated, there is frequently a requirement to keep the short-circuit currents high enough to provide for proper circuit-breaker coordination, and in such cases, it is sometimes tolerable to permit the voltage-regulator to initially start to depress the line-voltage, in response to a single-phase fault, provided that this regulator-action is reversed, so as to effect a voltage-raising action, by the time that the full synchonous reactance of the machine becomes available, or the time when the circuit-breaker action is obtained. Even in such a case, however, it is preferable, if possible, for the voltage-forcing action of the regulator to be in the proper direction, from the very start, although this requirement is not as paramount as in systems where there is a problem of stability or a problem of voltage-flicker avoidance.

My present invention relates to means for avoiding the necessity for deriving either the average three-phase voltage or the positive-sequence voltage of the line or system, while still retaining the advantage of current-responsive compensation, such as a reactive droop compensator, which is effective under all conditions in which it is necessary to maintain satisfactory parallel operation of the generators, that is, preventing one generator from hogging all of the wattless load and even feeding power into the other generator or generators acting as motors, thus burning up the overloaded generator. A regulator with the "average three-phase" feature has required two potential-transformers and a three-phase rectifier, besides the current-transformer for the compensator; while a regulator with the positive-sequence voltage-response has required two potential-transformers and one current-transformer, or two current-transformers and one potential-transformer.

An object of my present invention is to considerably reduce the amount of equipment that is required, by utilizing a single-phase derived voltage, and a limited-voltage compensator-arrangement which will supply a compensator-voltage which is substantially linearly responsive to the line-current, through full-load or permissible overload line-currents, and which thereafter has a voltage-limiting feature which limits the maximum compensator-voltage to a value which is only slightly larger than that which is obtained at full-load line-current and zero power factor. I have found that this gives proper compensation for all permissible sustained operating-conditions of the parallel-connected generators, but not during such momentary overload conditions, such as starting very large motors on the line, as endure for such a short time that improper parallel-operating conditions would not result in damage to the hogging generator, due to the shortness of the time involved. My new arrangement thus requires but one potential-transformer and one current-transformer, and the current-transformer may be made lighter, because most of the usual iron will be omitted from its magnetic circuit, in order to secure the desired saturating characteristic, for limiting the magnitude of the compensator-voltage.

With the foregoing and other objects in view, my invention consists in the circuits, systems, methods, combinations, and parts of apparatus, hereinafter described and claimed, and illustrated in the accompanying drawing, wherein the two figures are diagrammatic views of circuits and apparatus, illustrating my invention in two different illustrative forms of embodiment.

In the drawing, a plurality of parallel-connected generators are illustrated as comprising two three-phase generators G1 and G2, which may be considered as representative of any two synchronous dynamo-electric machines, parallel-connected to a common three-phase bus, A, B, C. This is intended only as an illustrative application of my invention, without intending to limit my invention altogether to the illustrated system. As the same voltage-regulating means are applied to both generators, the drawing has been simplified by showing such means associated only with the generator G2, with the understanding that similar equipment will be associated with the other generator.

In Figure 1, I have shown the generator G2 as being excited by a generator-field winding 3, which is energized from an exciter EXC having an exciter-field winding 5, which is energized from the exciter terminals through a multiple-contact regulator 6, which is a resistor having a large number of finely divided tap-points which are connected to flexible contact-vanes which are pressed together, in increasing numbers, by means of a spring 10 which is opposed by the electromagnetic pull of a voltage-regulating coil 11. The regulating voltage is provided in a new manner, which constitutes an embodiment of my present invention, by means of a potential-transformer 12, having a primary winding P which is energized from the phase-AB line-voltage or power-system voltage, which is obtained from two of the three-phase generator-terminals. The potential transformer has a secondary winding S which energizes the voltage-regulator coil 11 in series with a compensator-resistance R which is energized by means of a saturating auxiliary current-transformer 14, or its equivalent, which is energized, in turn, from the phase-C line-current as derived by the line-current transformer 15.

Figure 2:
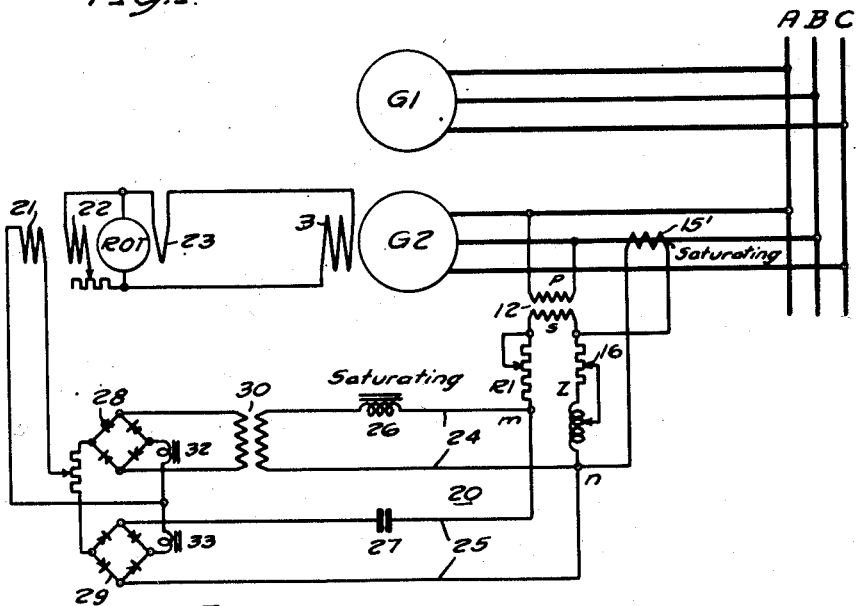

In Fig. 2, I have shown my novel compensated-voltage means in somewhat more detail, and with a slight variation, in which the line-current transformer 15' is made saturating; thus avoiding the use of an auxiliary saturating transformer 14. This is possible in installations in which the conventional non-saturating line-current transformer 15 of Fig. 1 is not needed for other uses such as metering or relaying.

In Fig. 2, also, the compensator-resistance R of Fig. 1 is replaced by a 60° impedance Z, and the saturating current-transformer 15' is connected in phase-B, rather than phase-C, of the generator-terminals, with the current-transformer terminals reversed. This produces a compensator-drop which is the same as in Fig. 1 on balanced loads, with the difference that, in Fig. 2, this compensator-voltage is present during phase-AB faults, when there is no phase-C current. In Fig. 2, the compensator-impedance Z is shown as being adjustable, by means of adjustable tap-points 16, so that adjustment of the saturating-point can be made, so as to limit the maximum compensator-voltage to, say, 7%, or other reasonable voltage, on the basis of a normal 5% compensator-voltage. In our Fig. 2, a voltage-regulating rheostat R1 is also shown, in series with the secondary winding S of the potential transformer, for the purpose of adjusting the voltage-norm to which the regulator responds.

In Fig. 2, I have also shown my invention applied to a voltage-reference network 20, which energizes the control-field 21 of a rotating amplifier ROT, which energizes the generator-field 3, in a manner similar to that which is described in my copending application, Serial No. 560,299, filed October 25, 1944, (Patent No. 2,426,018, granted August 19, 1947), and as shown also in a paper by C. E. Valentine and myself in the Transactions section of Electrical Engineering for August 1945, pages 601 to 606.

The rotating amplifier ROT is a dynamo-electric machine which performs as a direct-current generator operating on the linear part of its saturation-characteristic and completely self-excited by shunt and series fields which are only diagrammatically indicated at 22 and 23, respectively. Such a generator is capable of supporting itself at any voltage from zero up to the point of saturation, holding its voltage constant so long as its control-field 21 remains unexcited, and running the output-voltage up or down, in accordance with the direction of excitation of the control-field, whenever, and so long as, any excitation-current is supplied, in either the plus or minus direction, to the control-field.

The voltage-reference network 20 is a balanced-voltage network, operating on the principle of intersecting impedance-characteristics. It comprises two circuits 24 and 25, both of which are energized from the output-terminals $m$ and $n$ of the current-compensated voltage-deriving apparatus which has already been described. One of the circuits, such as 24, is provided with a non-linear impedance such as a saturating reactor 26, while the other circuit 25 is provided with a linear impedance of any kind, which is illustrated as a capacitor 27. The two circuits 24 and 25 energize separate rectifier-bridges 28 and 29, respectively, one of the circuits, such as 24, being connected to its rectifier-bridge through an insulating transformer 30. The direct-current output-terminals of the two bridges 28 and 29 are connected to each other, in circulating-current fashion, so that their direct-current or unidirectional output-currents are compared in magnitude, and the difference between these currents is supplied to the control-winding 21 of the rotating exciter ROT. The unidirectional output-currents of the rectifiers 28 and 29 are each smoothed out by a separate ripple-smoothing means, which is represented by the choke-coils 32 and 33, respectively.

The effect of the voltage-reference network 20 is to hold the line-voltage constant, at the value where the impedance-characteristics of the two impedances 26 and 27 intersect, causing the network 20 to have a base unidirectional output-voltage which is approximately zero, under these conditions. When the line-voltage either increases or decreases from this predetermined value, a resultant unidirectional output-voltage is supplied to the control-winding 21 of the rotating amplifier ROT, because the voltage-drop of the linear impedance 27 varies linearly with the line-voltage, while that of the saturating reactance 26 remains more nearly constant.

In the operation of my invention, the regulating voltage is derived from any one of the phases of the polyphase line-voltages, as determined from the polyphase terminals of the generator which is being regulated. This voltage-phase may be lettered AB. A saturating, or otherwise limited-voltage, reactive droop compensator, or other current-responsive compensator, is provided, which responds substantially linearly to the line-current, under all permissible sustained-load operating-conditions of the parallel-connected generators G1 and G2, but having only a slightly higher, limited, compensator-voltage, under brief-period, abnormal, overload, low-power-factor, operating-conditions of the parallel-connected generators.

To give a concrete illustrative example of a particular installation, which is merely intended to be exemplary of my invention, it may be assumed that the synchronous machine G2 has a negative-sequence reactance of 0.15, a subtransient reactance of 0.15, and a synchronous reactance of 1.2. It may also be assumed that the reactive droop compensator gives a 5% voltage at full-load 0% lagging current. That it is never necessary, in normal operation, for the compensator to produce more than 5% voltage, will be seen by assuming that the machine is designed to carry 1.5 load at 0.8 power factor, which produces a maximum per-unit wattless current of $1.5 \times 0.6 = 0.9$, thus requiring a compensator-voltage of $0.9 \times 0.05 = 0.045$, on a per-unit basis.

With such a machine, my compensator-voltage could be limited to any value which is slightly in excess of the requisite 5%, which is the most that would ever be required in normal operation. Thus, a saturating current-transformer, or other equivalent voltage-limiting means, could be adjusted to begin to saturate at about 5% voltage, and to limit the maximum compensator-voltage to not over 6% or 7%.

Designating the phase from which the regulator-voltage is derived as the AB-phase, if a dead short-circuit fault should occur on the AB-phase, the AB line-voltage will be zero, and the phase-C line-current, and hence the compensator-voltage $I_cR$, would be zero, and the regulator-voltage of Fig. 1 would drop to zero. In the particular type of regulating system shown in Fig. 2, however, a zero regulating-voltage would mean that no energy would be available for increasing the exciter-flux, and hence we utilize a phase-B compensator current which will provide a small regulator-voltage which will force the generator-voltage upward, from the initial instant of the fault.

Assuming a fault or short-circuit on either phase-BC or phase-CA, the phase-AB line-voltage will drop from unity to 0.866, and assuming a fault-current of 5.77 without any current-transformer saturation, the compensator-voltage $I_cR$ of Fig. 1 would be 0.288, in phase with the AB line-voltage, producing an increased regulator voltage of $.866 + .288 = 1.154$. According to my invention, however, the maximum compensator-voltage is limited to .07, and hence the resultant regulator-voltage will be $.866 + .07 = .936$, showing that the regulating voltage will be less than the norm, which is called unity, from the very first instant of the fault. These calculations are on the basis of the subtransient reactance of 0.15. By the time that the synchronous reactance of the machine comes into play, the regulator voltage, for a BC or CA short-circuit, will be reduced to .343, even without saturation; and to very nearly the same value, with saturation of the compensator-current transformer. In Fig. 2, the compensator-voltage $I_bZ$, for a phase-AB fault, would be 0.288 without saturation, and 0.07 with saturation, the same as in Fig. 1, but, for a phase-CA fault, the compensator-voltage $I_bZ$ would be zero, so that the regulator-voltage would be 0.866.

Even though the assumed machine should be required to carry motor-starting currents amounting to 1.5 to 2.0 per unit, at 0.5 power factor or lower, so that a compensator-voltage of more than 7% would be needed in order to obtain good parallel-generator operation, without one generator hogging all of the load and even feeding back motoring energy into the other generator or generators, my invention will still be applicable, because such a motor-starting situation will endure only for something like a second, or at the most for several seconds, which is too short a time to damage the hogging generator by reason of overheating therein.

From the foregoing illustrative example, it is apparent, therefore, that my limited-voltage compensator-means has two advantages. Principally, it causes the regulator-voltage, or the voltage which is applied to the regulator during fault-conditions, to be below normal, from the very start, for all fault-conditions, thus causing field-forcing in the right direction, from the very instant of the occurrence of the fault-condition. This is true for any synchronous machine in which the negative-sequence reactance is not materially greater than the subtransient reactance. In machines in which the negative-sequence reactance is large enough to produce a slight initial increase in the regulator-voltage when the compensator-reactance is added to the phase-AB line-voltage, the subtransient reactance of the machine will rapidly change to transient reactance, and finally it will change to synchronous reactance, and the synchronous reactance is always high enough, relative to the negative-sequence reactance, to make the regulator-voltage less than normal, provided that the maximum value of the compensator-voltage is limited to a value which is only slightly in excess of that which is required for satisfactory parallel-generator operation.

A second advantage of my limited-voltage compensator is that, during motor-starting conditions, the limit which is placed upon the compensator-voltage reduces the amount by which the compensated regulating-voltage is increased, during motor-starting conditions, thus reducing the voltage-depressing action of the voltage-regulating means during the motor-starting condition.

From the standpoint of the amount of equipment which is needed, it will be noted that my limited-voltage compensator, applied to a single-phase potential-transformer, eliminates the need for deriving the average three-phase voltage or for deriving the positive-sequence line-voltage, thus greatly reducing the amount of voltage-deriving equipment which is necessary, besides making it possible to employ a saturating line-current transformer which is less expensive than the normal non-saturating type.

While I have shown my invention in two illustrative forms of embodiment, and while I have explained it according to my best present understanding thereof, I do not wish to be limited to such illustration or explanation, or to the specific illustrative design-constants which have been given by way of example. I desire, therefore, that the appended claims shall be accorded the broadest construction consistent with their language.

I claim as my invention:

1. A voltage-regulator system for each of a plurality of polyphase generators which are adapted to be operated in parallel on a common polyphase bus, comprising the combination, with each generator, and its controllable exciting-means, of a single-phase voltage-regulator for controlling said exciting-means, and energizing-means for said voltage-regulator, said energizing-means serially comprising a voltage-deriving means, responsive to a generator-voltage, for deriving a single phase of the generator-voltage, and a limited-voltage generator-current-responsive reactive-droop compensator-means, associated therewith, responsive to a generator-current, for providing a sufficient, and substantially linearly current-responsive, compensator-voltage to give the generator voltage-characteristic a droop sufficient to permit satisfactory parallel generator-operation under all sustained-load operating-conditions of the parallel-connected generators, but said compensator-means including a voltage-limiting means operating only at compensator-voltages tending to exist under abnormal overload low-power-factor operating-conditions of the parallel-connected generators for causing said compensator-means to produce a limited compensator-voltage, said limited compensator-voltage being only slightly higher than the compensator-voltage which is produced under the highest sustained-load operating-conditions.

2. A generator system, comprising a plurality of polyphase generators connected in parallel to a common polyphase bus, each generator having such relative values of positive-sequence and negative-sequence reactances as to have a voltage-drop on all phases within a critical time after the occurrence of a single-phase fault on any phase, a controllable exciting-means for each generator, a single-phase voltage-regulator for controlling each exciting-means, and energizing-means for each voltage-regulator, the regulator-energizing-means for each machine serially comprising a voltage-deriving means, responsive to a generator-voltage, for deriving a single phase of the generator-voltage, and a limited-voltage generator-current-responsive reactive-droop compensator-means, associated therewith, responsive to a generator-current, for providing a sufficient, and substantially linearly current-responsive, compensator-voltage to give the generator voltage-characteristic a droop sufficient to permit satisfactory parallel generator-operation under all sustained-load operating-conditions of the parallel-connected generators, but said compensator-means including a voltage-limiting means operating only at compensator-voltages tending to exist under abnormal overload low-power-factor operating-conditions of the parallel-connected generators for causing said compensator-means to produce a lmited compensator-voltage, said limited compensator-voltage being only slightly higher than the compensator-voltage which is produced under the highest sustained-load operating-conditions.

3. A generator system, comprising a plurality of polyphase generators connected in parallel to a common polyphase bus, each generator having such relative values of positive-sequence and negative-sequence reactances as to have an initial voltage-drop on all phases whenever there is a single-phase fault on any phase, a controllable exciting-means for each generator, a single-phase voltage-regulator for controlling each exciting-means, and energizing-means for each voltage-regulator, the regulator-energizing-means for each machine serially comprising a voltage-deriving means, responsive to a generator-voltage, for deriving a single phase of the generator-voltage, and a limited-voltage generator-current-responsive reactive-droop compensator-means, associated therewith, responsive to a generator-current, for providing a sufficient, and substantially linearly current-responsive, compensator-voltage to give the generator voltage-characteristic a droop sufficient to permit satisfactory parallel generator-operation under all sustained-load operating-conditions of the parallel-connected generators, but said compensator-means including a voltage-limiting means operating only at compensator-voltages tending to exist under abnormal overload low-power-factor operating-conditions of the parallel-connected generators for causing said compensator-means to produce a limited compensator-voltage, said limited compensator-voltage being only slightly higher than the compensator-voltage which is produced under the highest sustained-load operating-conditions.

4. A generator system, comprising a plurality of polyphase generators connected in parallel to a common polyphase bus, each generator having a negative-sequence reactance which is not materially greater than the subtransient positive-sequence reactance, a controllable exciting-means for each generator, a single-phase voltage-regulator for controlling each exciting-means, and energizing-means for each voltage-regulator, the regulator-energizing means for each machine serially comprising a voltage-deriving means, responsive to a generator-voltage, for deriving a single phase of the generator-voltage, and a limited-voltage generator-current-responsive reactive-droop compensator-means, associated therewith, responsive to a generator-current, for providing a sufficient, and substantially linearly current-responsive, compensator-voltage to give the generator voltage-characteristic a droop sufficient to permit satisfactory parallel generator-operation under all sustained-load operating-conditions of the parallel-connected generators, but said compensator-means including a voltage-limiting means operating only at compensator-voltages tending to exist under abnormal overload low-power-factor operating-conditions of the parallel-connected generators for causing said compensator-means to produce a limited compensator-voltage, said limited compensator-voltage being only slightly higher than the compensator-voltage which is produced under the highest sustained-load operating-conditions.

5. The combination, with an alternating-current power-system, and a voltage-regulating means therefor, of a compensated system-voltage-deriving means, for connecting said voltage-regulating means to the system, said system-voltage-deriving means serially comprising a single-phase voltage-deriving means, responsive to a system-voltage, and a limited-voltage current-responsive compensator-means, associated therewith, responsive to a system-current, for providing a substantially linearly current-responsive compensator-voltage up to full-load system-currents, but said compensator-means including a voltage-limiting means operating only at compensator-voltages tending to exist for materially higher system-currents for causing said compensator-means to produce a limited compensator-voltage, said limited compensator-voltage being only slightly higher than the compensator-voltage which is produced in response to full-load system-currents.

6. The combination, with a polyphase power-system, and a voltage-regulating means therefor, of a compensated system-voltage-deriving means, for connecting said voltage-regulating means to the system, said system-voltage-deriving means serially comprising a single-phase voltage-deriving means, responsive to a system-voltage, for deriving a single phase of the polyphase system-voltage, and a limited-voltage current-responsive compensator-means, associated therewith, responsive to a system-current, for providing a substantially linearly current-responsive compensator-voltage up to full-load system-currents, but said compensator-means including a voltage-limiting means operating only at compensator-voltages tending to exist for materially higher system-currents for causing said compensator-means to produce a limited compensator-voltage, said limited compensator-voltage being only slightly higher than the compensator-voltage which is produced in response to full-load system currents.

7. The invention as defined in claim 6, characterized by the power-system having such fault-responsive voltage-characteristic that the compensated voltage which is applied to the voltage-regulating means is less than normal, from the first instant after the occurrence of any fault on any phase of the power-system.

8. A voltage-regulator system for a polyphase generator, comprising an exciting-means, operative to excite said generator, and a single-phase voltage-regulator, operative to control said exciting-means, characterized by said single-phase voltage-regulator having an energizing-means, operative to provide a single-phase controlling-voltage for said voltage-regulator, said energizing-means serially including a voltage-deriving means and a current-responsive means, said voltage-deriving means being responsive to a generator-voltage and being operative to derive a single phase of the generator-voltage, said current-responsive means being operative to provide a voltage-component which is responsive to a generator-current, said current-responsive means including a voltage-limiting means, operative to limit the further increase of said voltage-component only when said generator-current increases beyond its full-load value.

9. A voltage-regulator system for an alternating-current power-system, said voltage-regulator system having an energizing-means which is operative to provide a single-phase controlling-voltage for said voltage-regulator, said energizing-means serially including a voltage-deriving means and a current-responsive means, said voltage-deriving means being responsive to a system-voltage and being operative to derive a line-voltage from the system, said current-responsive means being operative to provide a voltage-component which is responsive to a system-current, said current-responsive means including a voltage-limiting means, operative to limit the further increase of said voltage-component only when said system-current increases materially beyond its full load value.

10. A voltage-regulator system for a polyphase power-system, said voltage-regulator system having an energizing-means which is operative to provide a single-phase controlling-voltage for said voltage-regulator, said energizing-means serially including a voltage-deriving means and a current-responsive means, said voltage-deriving means being responsive to a system-voltage and being operative to derive a single phase of the polyphase system-voltage, said current-responsive means being operative to provide a voltage-component which is responsive to a system-current, said current-responsive means including a voltage-limiting means, operative to limit the further increase of said voltage-component only when said system-current increases materially beyond its full-load value.

EDWIN L. HARDER.

REFERENCES CITED

The following references are of record in the file of this patent:

UNITED STATES PATENTS

| Number | Name | Date |
| --- | --- | --- |
| 1,857,174 | Zucker | May 10, 1932 |

FOREIGN PATENTS

| Number | Country | Date |
| --- | --- | --- |
| 834,163 | France | Nov. 15, 1938 |